Feb. 19, 1963 W. POSCHENRIEDER 3,078,427

ELECTROMECHANICAL FILTER WITH PIEZOELECTRIC DRIVE

Filed May 27, 1959

Inventor.
Werner Poschenrieder.
By. [signature] Att'y.

United States Patent Office 3,078,427

Patented Feb. 19, 1963

3,078,427

ELECTROMECHANICAL FILTER WITH PIEZOELECTRIC DRIVE

Werner Poschenrieder, Munich, Germany, assignor to Siemens & Halske Aktiengesellschaft Berlin and Munich, a corporation of Germany Filed May 27, 1959, Ser. No. 816,316
Claims priority, application Germany May 30, 1958
1 Claim. (Cl. 333—72)

Figure 1:
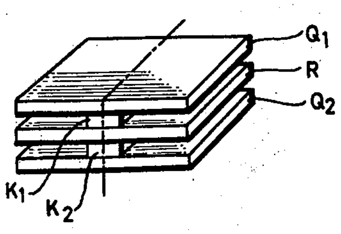

This invention is concerned with an electromechanical filter with piezoelectric drive and resonators effecting longitudinal oscillations or transverse oscillations.

It is known to construct a single-circuit electromechanical filter by the use of a quartz oscillator provided with piezoelectric drive means. For multi-circuit mechanical filters, there are used, for example, torsion oscillators which are interconnected by means of coupling elements subjected to torsion. Transverse oscillators which are mutually coupled by coupling rods engaging the oscillators marginally are also known for this purpose. Considerable disadvantages of these known structures reside in a mechanical binding action of the coupling elements and relatively great expenditure when it is desired to obtain with given band width a tolerably low basic damping.

The object of the invention is to show a way for providing in this respect considerable improvements, particularly in connection with spatially small electromechanical band filters operating within a frequency range from about 4 kilocycles to about 800 kilocycles at band widths from about 0.5 to 6%.

According to the invention, this object is realized in connection with an electromechanical filter with piezoelectric drive and resonators executing longitudinal or transverse oscillations, by coupling the resonators perpendicularly to the plane thereof by means of mechanical coupling members subjected to shearing stresses.

Figure 2:
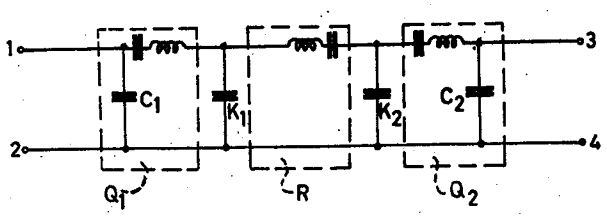
Figure 3:
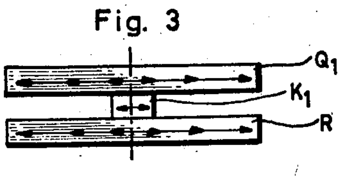
Figure 4:
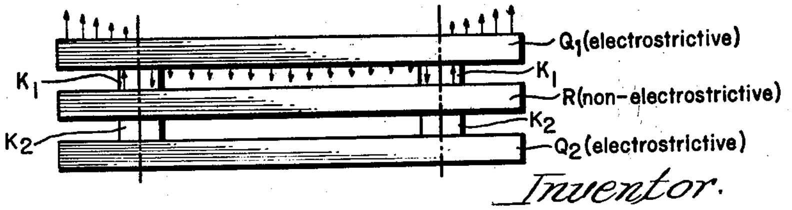

The various objects and features of the invention will appear from the description of embodiments which is rendered below with reference to the accompanying drawing. In the drawing, FIG. 1 shows an electromechanical filter consisting of three longitudinal oscillators;

FIG. 2 indicates a substitution circuit for the arrangement according to FIG. 1;

FIG. 3 is intended to aid in explaining the action of the arrangement shown in FIG. 1; and FIG. 4 illustrates the mechanical action in a structure having mechanical resonators operating with transverse oscillations.

In FIG. 1, the piezoelectric longitudinal oscillators Q1 and Q2 which are assumed to be provided with known exciting electrodes (not shown) serve respectively as filter input and filter output. The longitudinal oscillators Q1 and Q2 are coupled by way of coupling elements K1 and K2, with interposition of a further mechanical resonator R which is driven with the same oscillation shape as the oscillators or resonators Q1 and Q2.

The resonator plates Q1, Q2 and R having the coupling elements K1 and K2 interposed therebetween form a stack as illustrated. The coupling elements are structurally alike and are disposed symmetrically with respect to the dot-dash normal zone (nodal plane). The resonators Q1, Q2 and R and the coupling elements may be mechanically connected, for example, by means of a pair of springs engaging the resonators Q1 and Q2 on the outside in the nodal plane. It is, however, considerably more advantageous to connect the parts firmly together by cementing. In a working filter of the illustrated kind, the quartz resonators Q1, Q2 and R were connected with the coupling elements K1 and K2, made of polysterol, by cementing by means of a material known under the trade name "Araldit" which is a synthetic cement consisting of ethoxylin resins and used, for example, for cementing metal to glass and the like. The advantage of cementing is that the filter is made in the form of a mechanically stable structural unit wherein the resonators at the end which act in known manner as electrical terminals, form at the same time the carrier means. The end resonators are made of pronounced electrostrictive material for reasons of conversion of electrical into mechanical energy and vice versa; however, this requirement does not apply so far as intermediate resonators such as R and coupling elements K1 and K2 are concerned, which may be advantageously made of other materials, for example, metal, ceramic material, ferrite or synthetic materials.

FIG. 2 shows the substitution circuit for the arrangement according to FIG. 1. As will be seen, the three longitudinal oscillators operate within the band filter as series resonance circuits. The band width of the band filter is among others co-determined by the coupling elements K1 and K2 shown in the substitution circuit as transverse capacitances as well as by the coacting capacitances C1 and C2 of the piezoelectric end resonators Q1 and Q2 which serve as electrical terminal members 1, 2 and 3, 4.

The mechanical action of the arrangement according to FIG. 1 can be visualized by considering the schematic representation shown in FIG. 3. Incident to longitudinal oscillations, the resonator is respectively extended and shortened in the direction of the arrows. The stretchings increase thereby proportional to the spacing from the dot-dash symmetry axis (nodal plane) from the value zero to the maximum value at the resonator ends. The coupling element K1 transmits the forces acting in the direction of the longitudinal axes of the resonators (arrows shown within the resonators) by shearing from one to the other resonator. It is thereby by no means necessary that the resonators oscillate in phase.

The coupling factor depends upon the shift modulus G of the coupling element K and also very much upon the elongation in the direction of oscillation. The latter is to be explained by the fact that the elongations increase in the direction from the nodal plane.

The teaching of the invention is also advantageously applicable in case the mechanical resonators operate with transverse oscillations. The mechanical action is for this case schematically indicated in FIG. 4. Q1 and Q2 are in such case electrostrictive plates and R is a non-electrostrictive resonator plate, such plates executing transverse or bending oscillations about the nodal lines. Coupling elements K1 and K2 are arranged preferably symmetrical to nodal planes determined by the dot-dash nodal lines of the resonators, in the illustrated embodiment, two nodal planes. These coupling elements are subjected to shearing stresses in the direction indicated by arrows.

The above explained coupling for an electromechanical filter has as compared with prior arrangements the advantage of providing for a journalling which is free of reactive forces and in addition thereto provides for high constancy as to time and temperature, small volume with small longitudinal dimensions, small losses due to high mechanical perfection, simple mechanical structure and a mechanical simple piezoelectric drive.

Changes may be made within the scope and spirit of the appended claim which defines what is believed to be new and desired to have protected by Letters Patent.

I claim:

An electromechanical filter comprising piezoelectrically driven resonators for executing oscillations, at least one intermediate resonator made of nearly electrostriction-free material, and mechanical coupling members disposed between each adjacent pair of resonators, said coupling members being made of nearly electrostriction-free material and disposed perpendicularly to the plane of said resonators and symmetrically with respect to a zone remaining at rest, whereby each coupling member is simultaneously subjected to shearing stresses occurring at opposite sides of the associated zone, and the respective faces of said coupling members adjacent said resonators having areas which are relatively small compared with the areas of the adjacent faces of said resonators.

References Cited in the file of this patent

UNITED STATES PATENTS 2,373,431 Sykes ---------------- Apr. 10, 1945

2,443,471 Mason ---------------- June 15, 1948
2,596,460 Arenberg ---------------- May 13, 1952
2,695,357 Donley ---------------- Nov. 23, 1954
2,829,350 Ibsen ---------------- Apr. 1, 1958
2,877,432 Mattiat ---------------- Mar. 10, 1959
2,965,861 Sharma ---------------- Dec. 20, 1960
3,015,789 Honda et al. ---------------- Jan. 2, 1962